United States Patent
Murdock et al.

(10) Patent No.: US 9,606,219 B2
(45) Date of Patent: Mar. 28, 2017

(54) SYSTEMS AND METHODS FOR LOCATING A TARGET IN A GPS-DENIED ENVIRONMENT

(75) Inventors: Ronald G. Murdock, Portsmouth, RI (US); John D. Mackay, McMurray, PA (US); Douglas A. Cummins, Salem, CT (US)

(73) Assignee: Progeny Systems Corporation, Manassas, VA (US)

( * ) Notice: Subject to any disclaimer, the term of this patent is extended or adjusted under 35 U.S.C. 154(b) by 616 days.

(21) Appl. No.: 12/848,903

(22) Filed: Aug. 2, 2010

(65) Prior Publication Data

US 2012/0026041 A1 Feb. 2, 2012

(51) Int. Cl.
| | |
|---|---|
| *G01S 1/24* | (2006.01) |
| *G01S 5/14* | (2006.01) |
| *G01S 5/02* | (2010.01) |
| *G01S 11/08* | (2006.01) |

(52) U.S. Cl.
CPC .............. *G01S 5/14* (2013.01); *G01S 5/0289* (2013.01); *G01S 11/08* (2013.01)

(58) Field of Classification Search
CPC ........... G01S 5/14; G01S 5/0289; G01S 11/08
USPC ........................................................ 342/387
See application file for complete search history.

(56) References Cited

U.S. PATENT DOCUMENTS

| | | | |
|---|---|---|---|
| 3,705,404 A * | 12/1972 | Chisholm ..................... 342/465 |
| 5,506,587 A | 4/1996 | Lans | |
| 5,566,180 A | 10/1996 | Eidson et al. | |
| 5,600,706 A * | 2/1997 | Dunn et al. ................ 455/456.2 |
| 5,758,288 A * | 5/1998 | Dunn et al. ................ 455/456.5 |
| 5,890,068 A * | 3/1999 | Fattouche et al. ......... 455/456.2 |
| 6,054,950 A * | 4/2000 | Fontana ........................ 342/463 |
| 6,236,365 B1 * | 5/2001 | LeBlanc et al. ............. 342/457 |
| 6,373,834 B1 | 4/2002 | Lundh et al. | |

(Continued)

FOREIGN PATENT DOCUMENTS

| | | |
|---|---|---|
| WO | 99/46950 | 9/1999 |
| WO | 2010034769 | 4/2010 |
| WO | PCT/US/2011/045776 | 11/2011 |

OTHER PUBLICATIONS

IEEE Std 1588-2002 "IEEE Standard for a Precision Clock Synchronization Protocol for Networked Measurement and Control Systems" IEEE Instrumentation and Measurement Society, Published by The Institute of Electrical and Electronics Engineers, Inc., Nov. 8, 2001.*

(Continued)

*Primary Examiner* — Frank J McGue
(74) *Attorney, Agent, or Firm* — Law Office of Steven R. Olsen, PLLC; Steven R. Olsen (57) ABSTRACT

A system for locating an object in a GPS-denied environment includes first and second stationary nodes of a network and an object out of synchronization with a common time base of the network. The system includes one or more processors that are configured to estimate distances between the first stationary node and the object and a distance between the second stationary node and the object by comparing time-stamps of messages relayed between the object and the nodes. A position of the object can then be trilaterated using a location of each of the first and second stationary nodes and the measured distances between the object and each of the first and second stationary nodes.

1 Claim, 6 Drawing Sheets

(56) References Cited

U.S. PATENT DOCUMENTS

| | | | |
|---|---|---|---|
| 6,453,168 B1* | 9/2002 | McCrady et al. | 455/517 |
| 6,477,380 B1 | 11/2002 | Uehara | |
| 6,493,539 B1 | 12/2002 | Falco et al. | |
| 6,654,356 B1 | 11/2003 | Eidson et al. | |
| 6,665,316 B1 | 12/2003 | Eidson | |
| 6,754,513 B1 | 6/2004 | Ilg | |
| 6,865,484 B2 | 3/2005 | Miyasaka et al. | |
| 6,876,326 B2 | 4/2005 | Martoarana | |
| 6,941,482 B2 | 9/2005 | Strong | |
| 6,968,194 B2 | 11/2005 | Aljadeff et al. | |
| 7,039,421 B2 | 5/2006 | Couronne et al. | |
| 7,085,588 B1 | 8/2006 | Pfister et al. | |
| 7,126,937 B2 | 10/2006 | Crosbie et al. | |
| 7,228,136 B2* | 6/2007 | Myllymaki et al. | 455/456.1 |
| 7,286,624 B2 | 10/2007 | Woo et al. | |
| 7,299,056 B2 | 11/2007 | Anderson | |
| 7,299,057 B2 | 11/2007 | Anderson | |
| 7,302,269 B1 | 11/2007 | Crawford et al. | |
| 7,312,696 B2 | 12/2007 | Flick | |
| 7,313,404 B2 | 12/2007 | Anderson | |
| 7,317,925 B2 | 1/2008 | Niu et al. | |
| 7,330,150 B1 | 2/2008 | Beason et al. | |
| 7,345,630 B2 | 3/2008 | Tamaki et al. | |
| 7,411,937 B2 | 8/2008 | Guilford | |
| 7,565,147 B2 | 7/2009 | Simons et al. | |
| 7,729,336 B2 | 6/2010 | Pun et al. | |
| 7,729,707 B2 | 6/2010 | Aljadeff et al. | |
| 2002/0115448 A1* | 8/2002 | Amerga et al. | 455/456 |
| 2003/0119496 A1* | 6/2003 | Gaal et al. | 455/424 |
| 2003/0146871 A1* | 8/2003 | Karr et al. | 342/457 |
| 2003/0222819 A1* | 12/2003 | Karr et al. | 342/457 |
| 2005/0092823 A1* | 5/2005 | Lupoli et al. | 235/375 |
| 2007/0247368 A1 | 10/2007 | Wu | |
| 2009/0243934 A1 | 10/2009 | Ameti et al. | |
| 2009/0287927 A1 | 11/2009 | Kamperman | |
| 2009/0298515 A1 | 12/2009 | Czaja et al. | |
| 2010/0013712 A1 | 1/2010 | Yano | |
| 2010/0091924 A1 | 4/2010 | Wu | |
| 2010/0100759 A1 | 4/2010 | Blixt et al. | |
| 2010/0150117 A1 | 6/2010 | Aweya et al. | |
| 2011/0021210 A1 | 1/2011 | Medapalli | |

OTHER PUBLICATIONS

John Eidson, "IEEE-1588 Standard for a Precision Clock Synchronization Protocol for Networked Measurement and Control Systems", Agilent Technologies, Oct. 10, 2005.*

Wu et al., "Synchronizing Device Clocks Using IEEE 1588 and Blackfin Embedded Processors", Analog Dialogue 43-11, Nov. 2009.*

GloPos Bets Handsets Without GPS Can Provide Better-Than-GPS Accuracy Website: http://gigaom.com/2009/09/11/glopos-bets-handsets-without-gps-can-provide-better-than-gps-accuracy/ Date Published: Sep. 11, 2009.

S. Al-Kuwari et al, "A survey of forensic localization and tracking mechanisms in short-range and cellular networks", pp. 19-32 in S. Goel (ed.) Digital Forensics and Cyber Crime (Springer, Berlin/Heidelberg, 2010) ISBN: 10.1007/978-3-642-11534-9, http://www.springerlink.com/content/nwh614t3p40g4k15/).

Curtis W. Davis III et al, Enhanced Regional Situation Awareness, Lincoln Laboratory Journal, vol. 16, No. 2, 2007, pp. 355-380.

Reinhard Exel et al, High Accurate Timestamping by Phase and Frequency Estimation, ISPCS 2009 International IEEE Symposium on Precision Clock, Synchronization for Measurement, Control and Communication, Brescia, Italy, Oct. 12-16, 2009, pp. 126-131.

Reinhard Exel et al, A Novel, High-Precision Timestamping Platform for Wireless Networks, IEEE ETFA, 2009, pp. 1-8.

Bertrand T. Fang, Simple Solutions for Hyperbolic and Related Position Fixes, IEEE Transactions On Aerospace and Electronic Systems, vol. 26, No. 5, Sep. 1990, pp. 748-753.

Garner 1588v2 Summary Slideshow, Sep. 2008.

Smruti Parichha et al., Localization and Clock Synchronization Need Similar Hardware Support in Wireless LANs, ISPCS 2008—International IEEE Symposium on Precision Clock, Synchronization for Measurement, Control and Communication, Ann Arbor, Michigan, Sep. 22-26, 2008.

Secure Localization and Time Synchronization for Wireless Sensor and Ad Hoc Networks (Title Page and Table of Contents), edited by Poovendran et al, 2007 Springer Science Business Media, LLC.

John C. Eidson et al, IEEE-1588™ Standard For A Precision Clock Synchronization Protocol For Networked Measurement and Control Systems, Jul. 2008.

* cited by examiner

SYSTEMS AND METHODS FOR LOCATING A TARGET IN A GPS-DENIED ENVIRONMENT

This invention was made with government support under NNX10CA39C awarded by NASA. The Government has certain rights in the invention.

BACKGROUND

Global Positioning System (GPS) is widely used for, tracking, locating, and navigating purposes. However, "GPS-denied" environments exist in which GPS signals are weak or unavailable due to jamming, weather conditions, or physical obstructions, such as bridges or buildings. Moreover, GPS signals are unavailable for lunar and other space exploration operations. In such GPS-denied environments, other methods and instruments (e.g., astronavigation and Inertial Measurement Units (IMUs), which use a combination of accelerometers and gyroscopes) have been relied on for location and navigation.

However, alternatives to GPS have various disadvantages. For example, gyroscopes drift over time and by definition only provide relative position from a starting point versus an absolute measurement. Moreover, astronavigation provides only crude position resolution and astronavigation.

Some localization solutions that have been proposed in response to the foregoing problems rely on GPS as a complementary locating system. For example, according to one proposed solution, a device that lacks GPS access could communicate with one or more other devices that have GPS access to determine its position relative to the GPS-equipped device(s). However, solutions of this type typically suffer poor localization accuracy and ultimately rely on GPS for operation and are therefore ill-suited for application in every GPS-denied environment.

Another solution provides localization of an individual mobile subscriber using the resources of a cellular network. However, solutions of this type typically suffer poor localization accuracy. As well, localization is not the primary function of a cellular network and therefore typically requires temporary dedication of cellular base transceiver station towers in the neighborhood of the mobile subscriber, thus disrupting other traffic for a time.

SUMMARY

In general, example embodiments of the invention relate to methods and systems for locating an object in a GPS-denied environment using trilateration in a network of stationary nodes having known locations. In particular, the methods and systems operate to determine the location of an object by synchronizing a clock maintained at the object with a common time base maintained by clocks in the network of stationary nodes having known locations. Trilateration techniques are then used to determine the object's location based on time-of-flight measurements of radio signals relayed between the object and the stationary nodes.

In one example embodiment, a method for locating an object includes: establishing a bidirectional channel between the object and a first stationary node of a network; using the bidirectional channel, synchronizing a clock maintained at the object with a common time base maintained by a clock at each of the first stationary node and a second stationary node of the network; obtaining a first set of time-of-flight measurements using the common time base and one or more wireless signals sent between the object and the first and second stationary nodes; and estimating a first position of the object using the first set of time-of-flight measurements and location information of the first and second stationary nodes.

In another example embodiment, a system for locating an object includes first and second stationary nodes of a network and an object out of synchronization with a common time base of the network. Each of the nodes and the object includes: a clock; a transceiver configured to transmit outgoing signals and to receive incoming signals; and a time-stamper configured to time-stamp the incoming and outgoing signals using the clock as a time reference. The system further includes one or more processors configured to: estimate an offset of the clock at the object with respect to the common time base; based on the estimated clock offset, estimate a distance between the first stationary node and the object by comparing a time-stamp indicating a time of transmission and a time-stamp indicating a time of reception of a signal transferred between the first stationary node and the object; based on the estimated clock offset, estimate a distance between the second stationary node and the object by comparing a time-stamp indicating a time of transmission and a time-stamp indicating a time of reception of a signal transferred between the second stationary node and the object; and trilaterate a position of the object using a location of each of the first and second stationary nodes and the measured distances between the object and each of the first and second stationary nodes.

In yet another example embodiment, a wireless network for providing voice and/or data communications and for locating an object in communication with the network includes a plurality of stationary nodes and an object. Each stationary node is located at a tower and includes a stationary node clock and stationary node circuitry configured to wirelessly transmit and receive IEEE 1588 precision time protocol messages. The stationary node circuitry is further configured to wirelessly transmit and receive voice and/or data communications to and from other stationary nodes in the network. The object similarly includes an object clock and object circuitry configured to wirelessly transmit and receive IEEE 1588 precision time protocol messages. The object circuitry is further configured to wirelessly transmit and receive voice and/or data messages to and from the stationary nodes. Furthermore, the stationary node circuitry and/or the object circuitry includes a processor programmed to estimate a position of the object using: (i) time-of-flight measurements of a locator message wirelessly emitted from the object to each stationary node in a group of nearby ones of the stationary nodes, and (ii) predetermined location data of each stationary node in the group of stationary nodes, the predetermined location data being retrievable from a local memory, In addition, the network is an extensible network divisible into a main sub-network and a plurality of dependent sub-networks. The main sub-network has a stationary node whose clock serves as a grandmaster clock and each dependent sub-network has a stationary node whose clock serves as a boundary clock. The grandmaster clock provides a time base to which one or more of the boundary clocks synchronize and each boundary clock provides a time base to which clocks at stationary nodes in the corresponding dependent sub-network synchronize. The object circuitry is configured to synchronize the object clock with the time base maintained at a clock at one of the stationary nodes in the group of line-of-sight stationary nodes using IEEE 1588 precision time protocol messages. The object circuitry is further configured to emit the locator message after the object clock is synchronized.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to the figures wherein like structures will be provided with like reference designations. It is understood that the figures are diagrammatic and schematic representations of presently preferred embodiments of the invention, and are not limiting of the present invention, nor are they necessarily drawn to scale.

Embodiments of locating systems and methods described herein may provide, among other things, a means for accurately and reliably locating an object in a GPS-denied environment. An example system includes a network of stationary nodes synchronized or capable of being synchronized to a common time base. An object to be located is configured to establish a bidirectional communication channel with one of the stationary nodes. Using the bidirectional communication channel, the object is able to send and receive synchronization signals and thereby synchronize to the common time base. A trilateration processer located in either the object or the network of stationary nodes can then perform a trilateration process to locate the object with reference to predetermined locations of the stationary nodes.

I. System Overview

Figure 1:
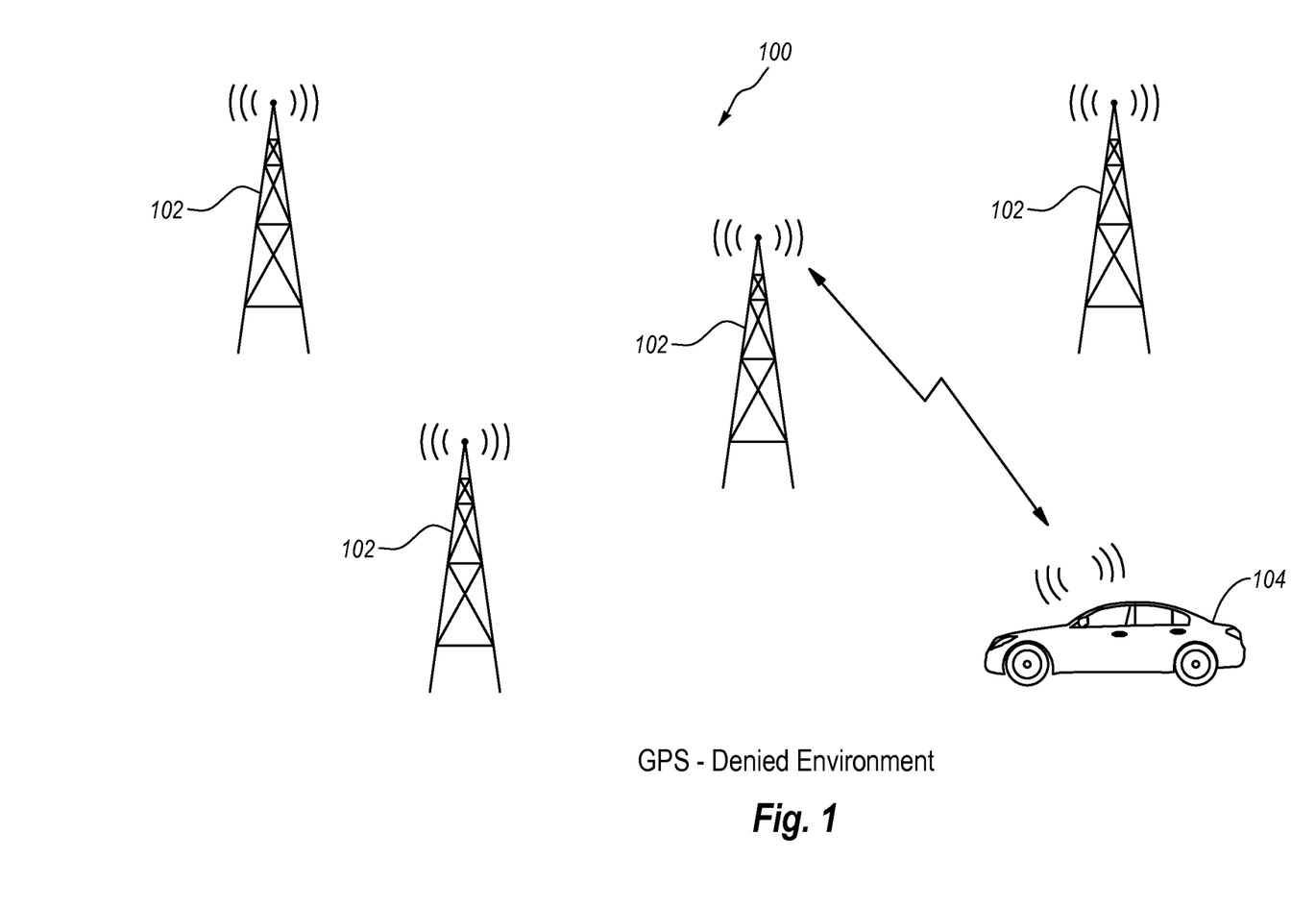
FIG. 1 shows an example system operating in an outdoor GPS-denied environment.

FIG. 1 shows an example outdoor GPS-denied environment in which example systems and methods of the invention are used. FIG. 1 further shows a system 100 including a network of stationary nodes 102 (e.g., towers) and a mobile object 104 (e.g., a car) operating in the GPS-denied environment. The term "node" as used herein denotes a structure or device having communication circuitry that is in communication with other similarly equipped nodes in a network. A node may also include a clock and clock adjuster circuitry that adjusts the clock to be in synchronization with a time base common to all nodes in the network of nodes (or within a sub-network of the network). A common time base is typically characterized by clocks at separate nodes having the same "time of day" and having a pulse edge, called "pulse per second" to reference that time. Moreover, according to certain synchronization protocols, the clocks can also be phase synchronized (i.e., syntonized). The clocks typically implement a servo clock that can change its output frequency, making it essentially a numerically controlled oscillator. The clocks can then run either at the same frequency or have the phase error of their waveforms be bounded by a syntonization accuracy.

Stationary nodes 102 include antennas mounted on spatially separated towers. In one embodiment, none of stationary nodes 102 in system 100 is equipped with a GPS receiver. However, the locations of each of stationary nodes 102 are determined at a time of installation using GPS receivers, or other precision locating techniques, such as surveying with reference to a known location.

The towers of stationary nodes 102 may be separated from each other by distances ranging from about tens of feet to hundreds of miles in some embodiments. The spatial density of stationary nodes 102 depends on such factors as power limitations of transmitting circuitry and topography of a region in which stationary nodes 102 are deployed. For example, if the topography is relatively mountainous or occupied by large, tall buildings a multipath effect can degrade network communications if stationary nodes 102 are spaced too far apart. However, tower heights may be adjusted to achieve direct line of sight between towers and thereby improve quality of communications between stationary nodes 102. Although stationary nodes 102 are depicted as towers in an outdoor environment, use of system 100 is not limited to outdoor environments. If implemented in an indoor environment, such as a building, stationary nodes 102 could be mounted on walls or posts of the building instead of on towers.

In one embodiment, one or more of the towers of stationary nodes 102 are cellular network towers with predetermined locations and communications between stationary nodes 102 include voice and data. In another embodiment, the towers of stationary nodes 102 are built specifically for the purpose of locating one or more mobile objects, such as mobile object 104, but may also include some capabilities of transferring voice and/or data. For example, in one application of the invention, stationary nodes 102 are located in a remote and sparsely populated area on earth or even on the surface of the moon or another planet, such as Mars, where cellular network towers do not exist.

Moreover, communications between stationary nodes 102 may be accomplished via any suitable communications media including wireless media (e.g., radio, optical, or acoustical media) or wired media (e.g., electrical or optical fiber media). In some embodiments, these various media are configured to be distributed, loosely-coupled packet networks which support full multicast transmissions (one node to all nodes) or addressed multicast transmissions (one node to selected several nodes). According to one aspect of loosely-coupled packet networks, there does not exist a network-wide carrier signal or synchronous bus that is continually asserted on the media, but rather each transmission of a message or packet is transient and comprises a preamble, a header, and a payload. The preamble is either a carrier signal with predefined modulation code or a time-sequence of pulses that allows all receivers to synchronize to the signals that follow or decode time-coded signals that follow. The header is a transmitted block of data that carries house-keeping information for the network, such as message identifiers, sender identifiers, recipient node addresses and the like, or node clock protocol information. The payload of the message or packet is a representation interpretable by a receiver or a processor associated with the receiver as voice, analog data, digital data, executable instructions or other mission-specific knowledge or code.

A topology of stationary nodes 102 may be configured to facilitate implementation of a clock synchronization protocol, such as IEEE 1588 precision time protocol (PTP). IEEE 1588 PTP is described in "IEEE Standard for a Precision Clock Synchronization Protocol for Networked Measurement and Control Systems," published by the IEEE on Jul. 24, 2008, incorporated herein by reference in its entirety. One implementation of IEEE 1588 PTP operates in a single master to multi-slave network topology. Thus, stationary nodes 102 are positioned to facilitate line-of-sight or near line-of-site communications between a master node and a plurality of slave nodes.

Moreover, the network topology of stationary nodes 102 may be extensible and may have multiple domains or sub-networks, each of which has a single master to multi-slave topology. An extensible network may have a grand-master stationary node, which serves as a single source of precise time for all slave nodes in a main sub-network and one or more of the slave nodes in the main sub-network can serve as boundary clocks for sub-networks dependent on the main sub-network for clock synchronization. Thus, a slave node serving as a boundary clock acts as a slave node in the main sub-network, but is a master node in its sub-network. Accordingly, a sub-network of stationary nodes 102 may serve as a navigational enclave within an extensible network.

Mobile object 104 may include a portable personal computing device, such as a laptop, netbook, personal digital assistant, or the like, and/or may be integrated with the structure of a boat, aircraft, spacecraft, or vehicle, such as a car, truck, or robot. Moreover, mobile object 104 may be frequently mobile and be located repeatedly over its life. Alternatively mobile object 104 may be mobile for only a relatively short portion of its life and therefore be located only once or a relatively small number of times. For example, mobile object 104 may be a projectile, such as munitions or rounds, whose initial location is to be estimated once at a time of launch. As another example of a relatively immobile object, mobile object 104 may be an object that is dropped by parachute and whose trajectory is to be tracked and/or whose final landing position is to be estimated only a single time during its useful life.

Mobile object 104 is equipped with communications and clock circuitry (e.g., a clock and clock adjuster circuitry) similar to that of stationary nodes 102. Thus, mobile object 104 is able to initiate, or respond to initiation of, a bidirectional wireless communications channel with one or more of stationary nodes 102. Moreover, although a single mobile object 104 is depicted in FIG. 1, multiple mobile objects may be in communication with stationary nodes 102 and their positions may be estimated according to the techniques and principles described herein.

II. Synchronization

Figure 2:
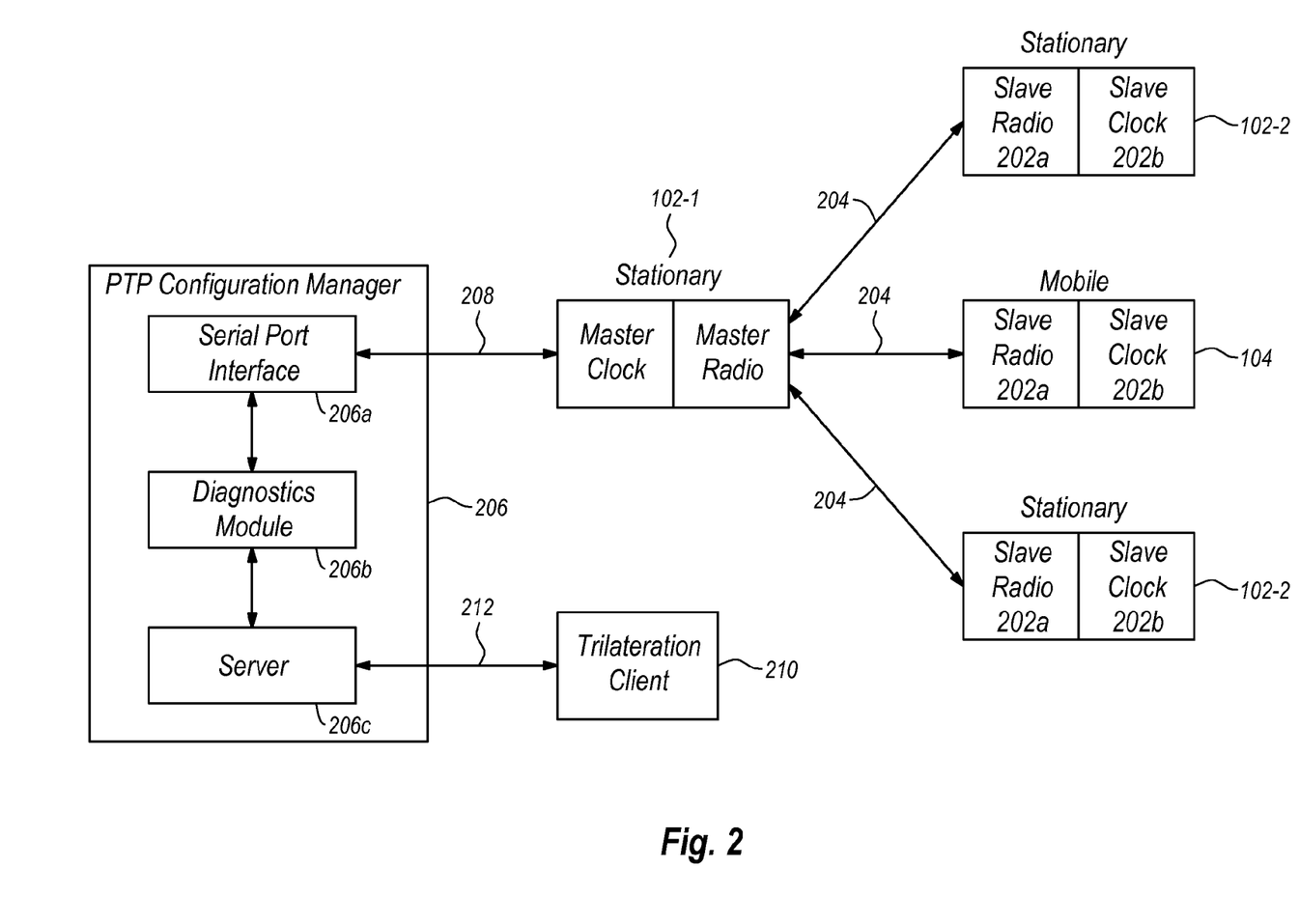
FIG. 2 shows a functional block diagram of elements in the system of FIG. 1.

FIG. 2 shows a functional block diagram of elements in a system 100. Stationary nodes 102 are grouped into a master node 102-1 and slave nodes 102-2. The designation of a node as a master or slave node is a logical designation, which may be altered as necessary by operator input or automatically according to a Best Master Clock Algorithm (BMCA) described in the IEEE 1588 PTP standard. For example, to improve reliability of wireless communications between the master node and each slave node an operator will typically designate a node that is located centrally with respect to a group of nodes as a master node for the group. A slave node is a "slave" and a master node is a "master" in the sense that slave nodes receive commands from and synch their clocks to that of a master node. Moreover, as explained above, a slave node may function as a slave node with respect to one sub-network and may function as a master node with respect to another sub-network.

Stationary nodes 102 and mobile object 104 each include a radio 202a and a clock 202b. When system 100 is in operation, bidirectional wireless channels 204 are regularly established between master node 102-1 and slave nodes 102-2 to keep clocks in system 100 synchronized to a common time base. Moreover, when mobile object 104 comes into sufficient proximity of a node in system 100, mobile object 104 may wirelessly communicate with system 100 via bidirectional channel 204 between mobile object 104 and master node 102-1 (as shown) or one of slave nodes 102-2. Then, upon synchronization of a clock in mobile object 104 to a common time base of system 100, mobile object 104 is designated a slave node within system 100. A position of mobile object 104 is determined or estimated using locator pulses multicast from mobile object 104 to a plurality of stationary nodes 102 (or unicast in the reverse direction) and trilateration techniques, as described in more detail below with reference to FIG. 3.

Master node 102-1 transmits (by multicasting or unicasting) messages to slave nodes 102-2 and mobile object 104 over channels 204. Messages transmitted from master node 102-1 and slave nodes 102-2 and mobile object 104 include synchronization messages (including "General" messages, such as Followup, Delay_Resp, and Pdelay_Resp Follow_Up messages as defined by IEEE 1588 PTP). Messages communicated to master node 102-1 from slave nodes 102-2 and mobile object 104 are sent over channels 204 and include similar synchronization messages defined by IEEE 1588 PTP, and a node identification. By way of example and not limitation, system 100 implements a communications scheme in which each node transmits synchronization maintenance messages to other nodes in a staggered or random fashion to reduce the chance of collisions.

In addition to synchronization messages, other forms of data, e.g., data sensed by mobile object 104, can be communicated over channels 204. Thus, system 100 can be used not only to locate mobile object 104 but also to send data and commands to and receive data and commands from mobile object 104. Moreover, although mobile object 104 is depicted as communicating synchronization messages directly with master node 102-1, mobile object 104 may instead communicate with master node 102-1 via a slave node 102-2 to synchronize its clock with the common time base.

A PTP configuration manager 206 communicates with master node 102-1 over a bidirectional channel 208 and with a trilateration client 210 over another bidirectional channel 212. PTP configuration manager 206 manages clock synchronization in accordance with IEEE 1588 PTP. PTP configuration manager 206 includes a serial port interface 206a that interfaces with master node 102-2 via channel 208, a diagnostics module 206b that diagnoses errors and delays in the PTP clock synchronization, and a server 206c that interfaces with trilateration client 210. PTP time messages, node status, and delay data are transferred from master node 102-2 to diagnostics module 206b via channel 208 and serial port interface 206a and PTP configuration data is transferred in the opposite direction to master node 102-2. PTP time messages, node status, and delay data are defined by IEEE 1588 PTP and are therefore not described in detail herein. However, delay data is passed to trilateration client 210 via server 206c and is used in a way not that is described by IEEE 1588 PTP. That is, the delay data is used to determine time-of-flight measurements of one or more signals transmitted between mobile object 104 and a plurality of stationary nodes 102. The trilateration process is described in more detail below with reference to FIG. 3.

Bidirectional channel 208 is implemented using a Universal Serial Bus (USB) cable and USB messaging protocols. Moreover, bidirectional channel 212 is implemented using an Ethernet cable and Ethernet messaging protocols. However, channels 208 and 212 are not limited to the foregoing implementations. Channels 208 and 212 may instead be implemented with any other suitable protocol over any suitable media including, e.g., wired and wireless media. Furthermore, in one alternative embodiment, PTP configuration manager 206 and trilateration client 210 are implemented as a single device and channel 212 is therefore omitted or subsumed in the device. In a further modification, the device in which PTP configuration manager 206 and trilateration client 210 are implemented is integrally part of and/or located proximate to master node 102-1. Therefore, in this further modification, channel 208 is also omitted or subsumed in master node 102-1.

In an example method of the invention (explained in more detail below with reference to FIG. 5), master node 102-1 uses its radio to send commands causing slave clocks at slave nodes 102-2 and at mobile object 104 to become synchronized to a common time base governed by the master clock at master node 102-1 in accordance with a synchronization protocol, such as IEEE 1588 PTP.

According to IEEE 1588 PTP, synchronization at a slave node is accomplished by time-stamping outgoing and incoming messages (e.g., Sync, Follow Up, Delay_Req, Delay_Resp, Pdelay_Req, Pdelay_Resp, and Pdelay_Resp_Follow_Up messages as defined by IEEE 1588 PTP) and a similar time-stamping is performed with respect to the same messages at the master node. Time-stamps are added to incoming and outgoing messages using a local clock as a time reference by time-stamp circuitry that is physically and logically close to the physical layer (e.g., the antenna) of each node. The time-stamps of such messages are then used to compute both a clock offset at the slave node relative to the master node's clock and a path delay between the slave node and the master node.

Time-stamp comparison operations can be performed at master node 102-1, at PTP configuration manager 206, or at the slave node being synchronized. The time-stamps of such messages applied by the slave node are then corrected for the appropriate path delay between the slave node and the master node and used to calculate both a clock offset and clock speed ratio at the slave node relative to the master node's clock. The clock at the slave node is then adjusted using these calculated clock offset and clock speed ratio values. Once slave nodes 102-2 are synchronized to master node 102-1, system 100 is ready to synchronize a clock at mobile object 104 by a similar process and to then estimate its position using trilateration. Additional details of the synchronization process between a master node and slave nodes is described in the IEEE 1588 PTP standard.

III. Locating by Trilateration

Figure 3:
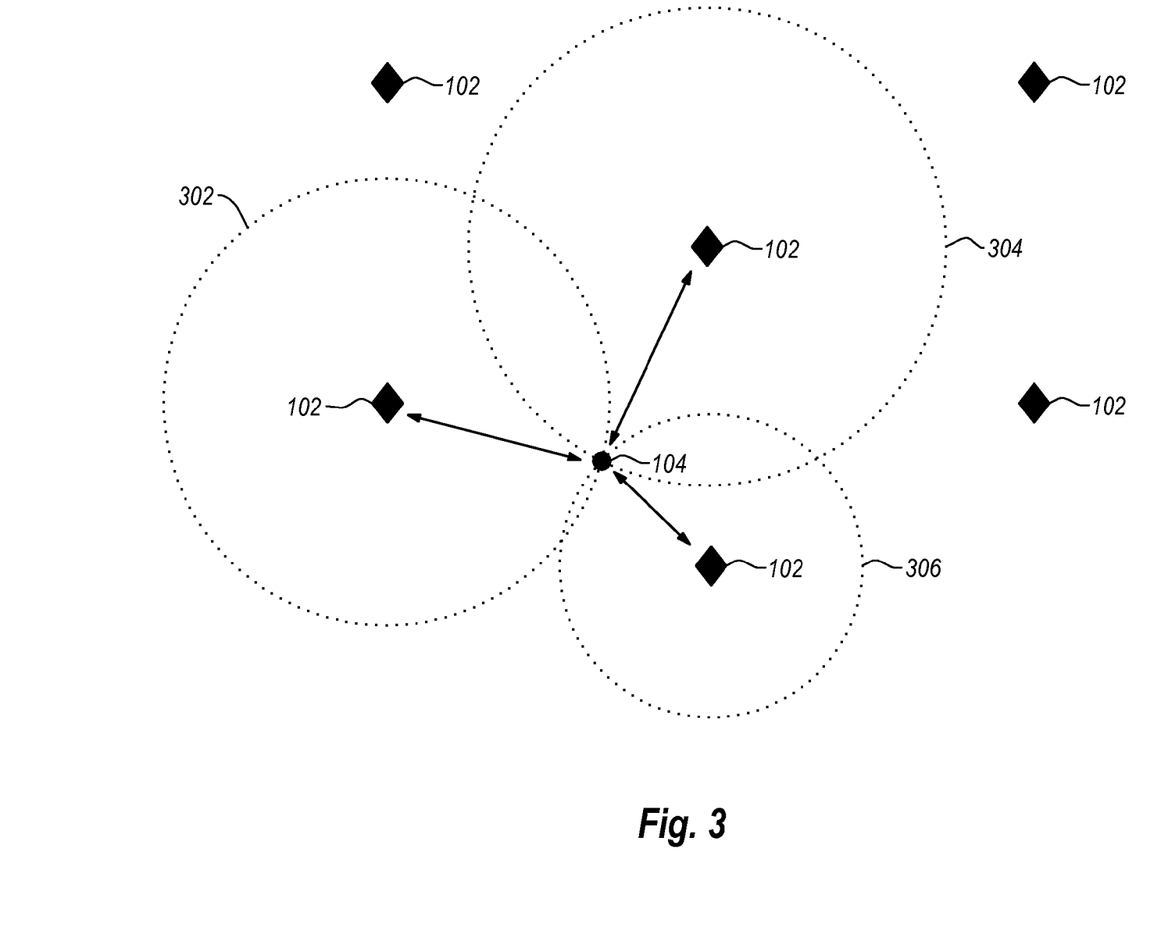
FIG. 3 shows an overhead view of the system of FIG. 1 and graphically depicts a trilateration process for locating an object.

FIG. 3 shows an overhead view of system 100 including stationary nodes 102 and mobile object 104 and graphically depicts a trilateration technique for locating mobile object 104. Upon synchronization of mobile object 104 with a common time base maintained in system 100, a single locator pulse or message may be multicast from mobile object 104 to selected stationary nodes that are most proximate to and/or in line-of-sight relationship to mobile object 104. Notably, the selected stationary nodes are not limited to slave nodes but may also include a master node. In an alternative method, multiple locator messages are unicast, one from each of the selected stationary nodes, to mobile object 104. In yet another alternative method, multiple locator messages are unicast from mobile object 104 to each of the selected stationary nodes. In any one of the foregoing alternatives, each locator message is time-stamped upon transmission and upon reception. Because wireless signals travel at a constant speed (e.g., speed of light or speed of sound), time-of-flight measurements can be obtained by comparing transmission and reception time-stamps. Both the multicast locator pulse or message method and the unicast method may be repeated and the derived time-of-flight data averaged to improve a quality or reliability of that data.

To perform trilateration, at least two stationary nodes (but frequently more than two stationary nodes) having predetermined locations transmit or receive locator messages to or from mobile object 104. A first time-of-flight measurement corresponds to a first circle 302 that represents a cross-section of a sphere in three-dimensional space. First circle 302 is centered at the location of a first stationary node that sent or received the locator message. This first time-of-flight measurement therefore indicates that the location of mobile object 104 is somewhere on first circle 302 centered at the location of the first stationary node. A second circle 304 (also representing a cross-section of a sphere) centered at the location of a second stationary node is determined in a similar fashion and intersects first circle 302 at two points. Thus, if some general location information is already known about the location of mobile object 104 (e.g., a general direction of travel with respect to a known origin point), an ambiguous intersection point can sometimes be eliminated from consideration. Accordingly, the location of mobile object 104 in a two-dimensional coordinate space can in some cases be estimated using only two stationary node locations and their corresponding time-of-flight measurements.

However, a time-of-flight measurement corresponding to a third circle 306 (representing a cross-section of a sphere) centered at a third stationary node's location may be required where insufficient information about the location of mobile object 104 is available or if a location of mobile object 104 in a three-dimensional coordinate space is desired. Moreover, due to measurement errors, additional stationary node time-of-flight measurements and locations can be used to obtain better position accuracy.

As depicted in FIG. 2, trilateration calculations may be performed at trilateration client 210 by a processor programmed to perform trilateration. However, one or more similar trilateration processors programmed to perform trilateration calculations may be located anywhere in system 100 including, for example, at master node 102-1 or at mobile object 104. Moreover, location data of each stationary node may be stored in a memory accessible to the trilateration processor. The location data may be determined and stored at a time of installation of stationary nodes 102.

Once a position or location of mobile object 104 is estimated, the result is reported to mobile object 104 or to an operator station communicatively tethered to system 100. The process of estimating a position of mobile object 104 may be repeated according to a predetermined schedule or in response to an operator request.

IV. Example Node

Figure 4:
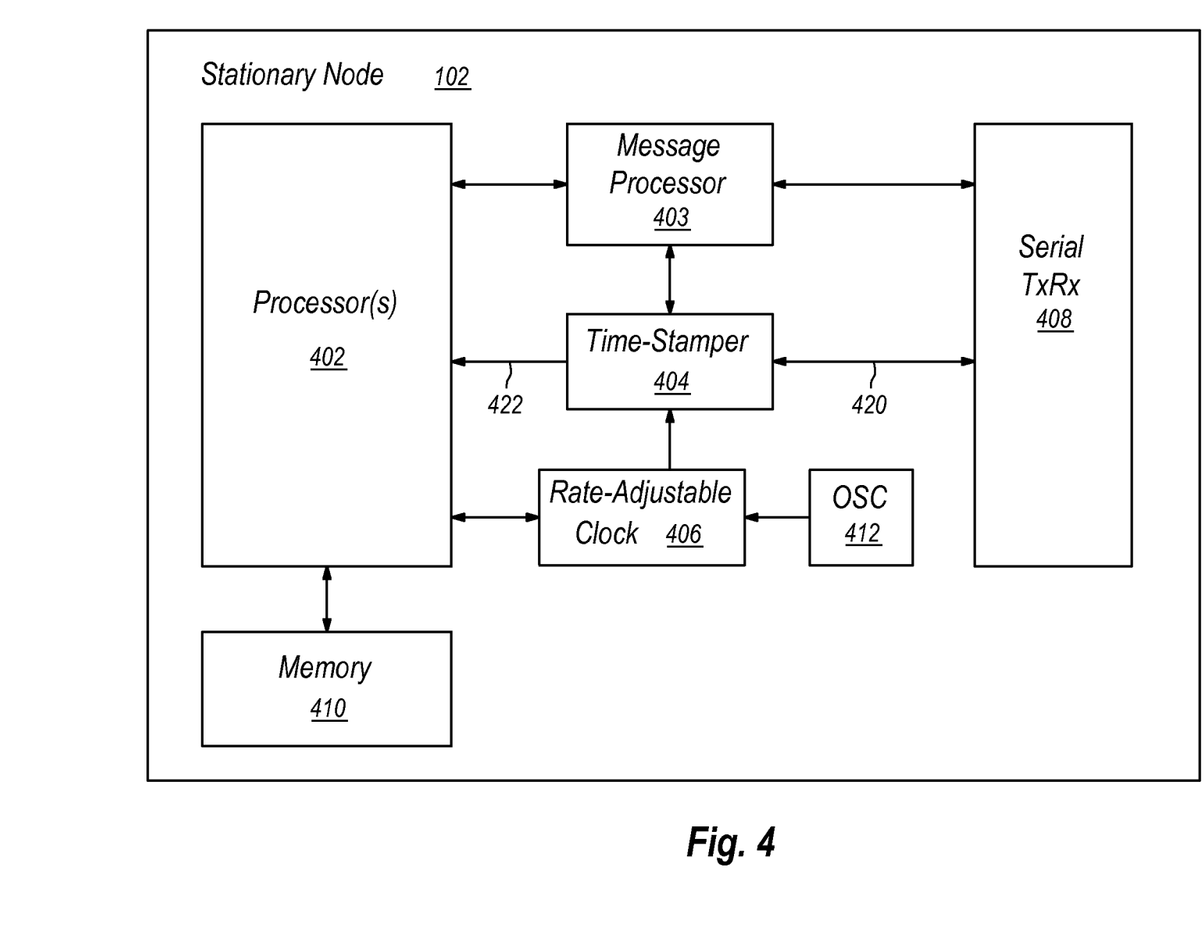
FIG. 4 shows an example functional block diagram of circuitry in a node of the system of FIG. 1.

FIG. 4 shows an example functional block diagram of circuitry in one of stationary nodes 102. Corresponding circuitry is also implemented in mobile object 104. As depicted in FIG. 4, stationary node 102 includes a main processor (or processors) 402 that communicates with a message processor 403, a time-stamper 404, a rate-adjustable clock 406, a serial transceiver 408, and a memory device 410. A local oscillator 412 that provides input to rate-adjustable clock 406, which can be adjusted by commands from processor 402, is also included in stationary node 102. Additional circuitry that is not shown may also be included in stationary node 102 and in mobile object 104 but is omitted from this description for clarity.

Processor 402 controls the various electronic components within stationary node 102. In some embodiments, processor 402 may also be programmed or programmable to perform trilateration processing in accordance with the trilateration process described above. Some of the data needed to perform the trilateration may be received from other nodes via serial transceiver 408 and subsequently stored in memory device 410.

Message processor 403 performs at least some of the functions of the event interface described in the IEEE 1588 PTP standard. Thus, message processor 403 recognizes or detects the time-stamp insertion point in both incoming and outgoing messages (also called packets in some embodiments). By way of example and not limitation, a time-stamp insertion point may be after a message or packet header and may include a recognizable bit pattern demarking the start of frame (SOF) of a data payload of the packet. When message processor 403 recognizes the time-stamp insertion point of a message being transmitted or received, it triggers time-stamper 404 to obtain the current time from clock 406. This reading of clock 406 is the time-stamp and may be used in several ways.

Time-stamper 404 may provide the time-stamp to serial transceiver 408 via data path 420 and, if suitably equipped, serial transceiver 408 may insert the time-stamp into a reserved field of a packet being transmitted or received "on the fly" (i.e., without substantial interruption to a data transmission/reception process). Alternatively, if serial transceiver 408 is not so equipped, time-stamper 404 provides the time-stamp to processor 402 by way of data path 422 for later association with the corresponding incoming or outgoing message. In either alternative, time-stamper 404 provides the time-stamp to processor 402, which in turn can store the time-stamp in memory device 410, thereby recording a time when an outgoing or incoming message is sent or received. According to a provision of the IEEE 1588 PTP standard, in the case a time-stamp cannot be inserted into a transmitted message "on the fly", the time-stamp can be sent in a subsequent "Follow_Up" or "Pdelay_Resp_Follow_Up" message. The association in memory 410 of a transmitting node and similar memory 410 in a receiving node of time-stamps in follow up messages with their corresponding messages for which the time-stamp is valid may be facilitated by IEEE 1588 PTP message header fields such as "sequenceID". In the IEEE 1588 PTP standard, nodes having "on the fly" time-stamping means are referred to as "one-step clocks", while nodes not having "on the fly" time-stamping means but relying on follow up messages are referred to as "two-step clocks". Message processor 403 and time-stamper 404 are located in physical and logical proximity to serial transceiver 408 to avoid synchronization errors due to processing delay introduced by message processing.

Serial transceiver 408 provides a bidirectional interface for stationary node 102 to communicate with other nodes. Serial transceiver 408 processes incoming and outgoing signals that are sent to and from processor 402. In addition to signal processing circuitry, such as modulator/demodulator circuitry, serial transceiver 408 includes a physical communication layer (e.g., an antenna, optical emitter and detector, and/or acoustic transducers). Moreover, as discussed above, serial transceiver 408 can in certain embodiments insert a time-stamp into a reserved field of a packet being transmitted or received "on the fly."

V. Example Methods

Figure 5:
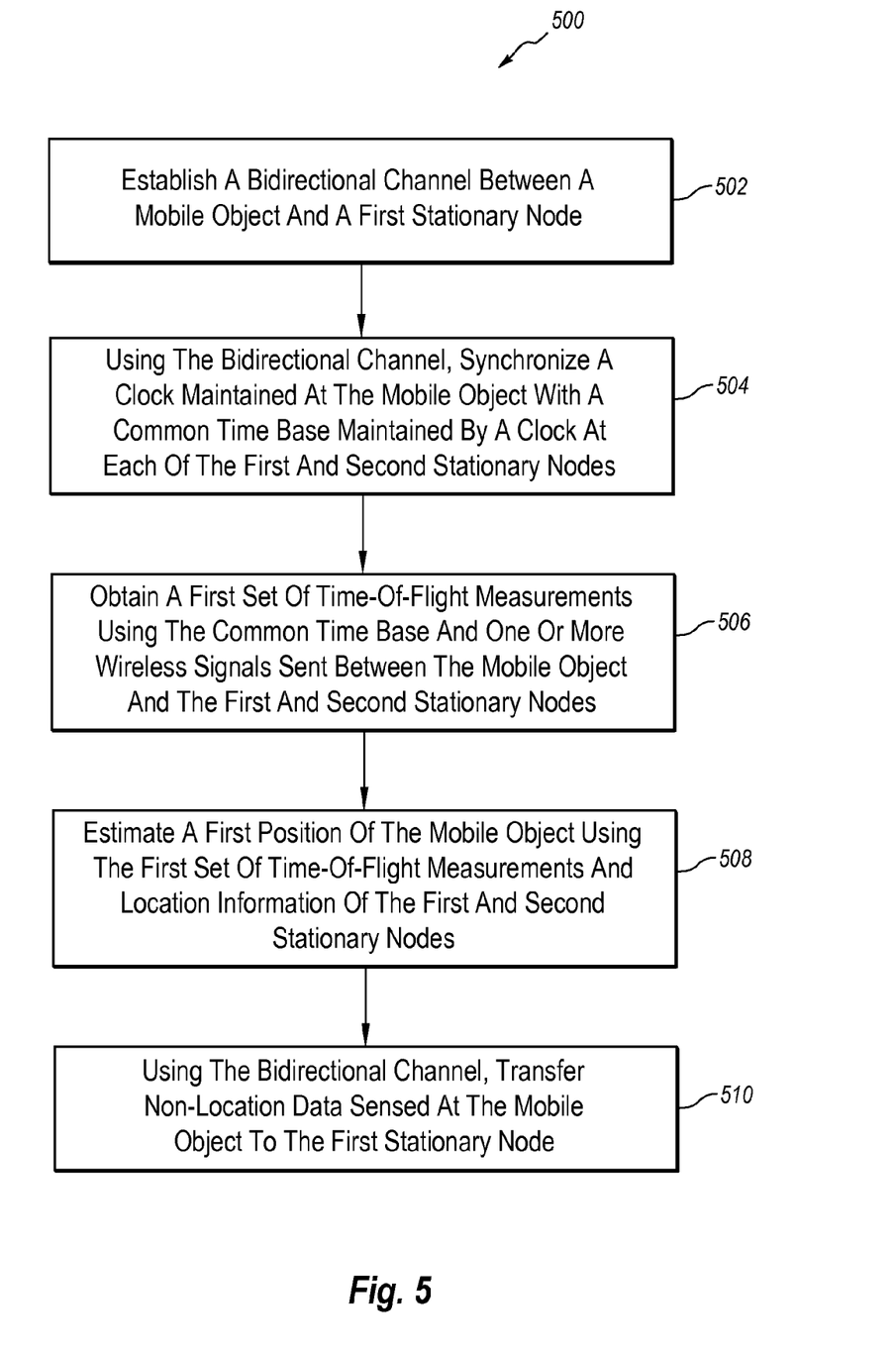
FIG. 5 shows an example method for locating an object in the system of FIG. 1.

FIG. 5 shows an example method 500 for locating mobile object 104. Method 500 may be implemented in system 100 using software, hardware, or some combination thereof. In method 500 a bidirectional channel is established between mobile object 104 and a first stationary node of system 100 (stage 502). Using the bidirectional channel, a clock maintained at mobile object 104 is synchronized with a common time base maintained by a clock at each of the first and a second stationary node of system 100 (stage 504). Next, a first set of time-of-flight measurements is obtained using the common time base and one or more wireless signals sent between the object and the first and second stationary nodes (stage 506). A first position of mobile object 104 is then estimated using the first set of time-of-flight measurements and location information of the first and second stationary nodes (stage 508). The location information of the first and second stationary nodes can be obtained during installation of system 100 or before mobile object 104 is deployed for a mission. A memory in which the location information is stored may be located at any node or device in or in communicative relationship with system 100, including at mobile object 104.

In addition, mobile object 104 may use the bidirectional channel to transfer non-location data sensed by mobile object 104 to the first stationary node (stage 510). For example, if mobile object 104 is a robotic vehicle deployed on an exploratory mission in a remote location it may be desirable to associate collected data with the location at which the data was collected. A processor and database at mobile object 104 or elsewhere in system 100 may store records of collected data points and their associated locations.

Figure 6:
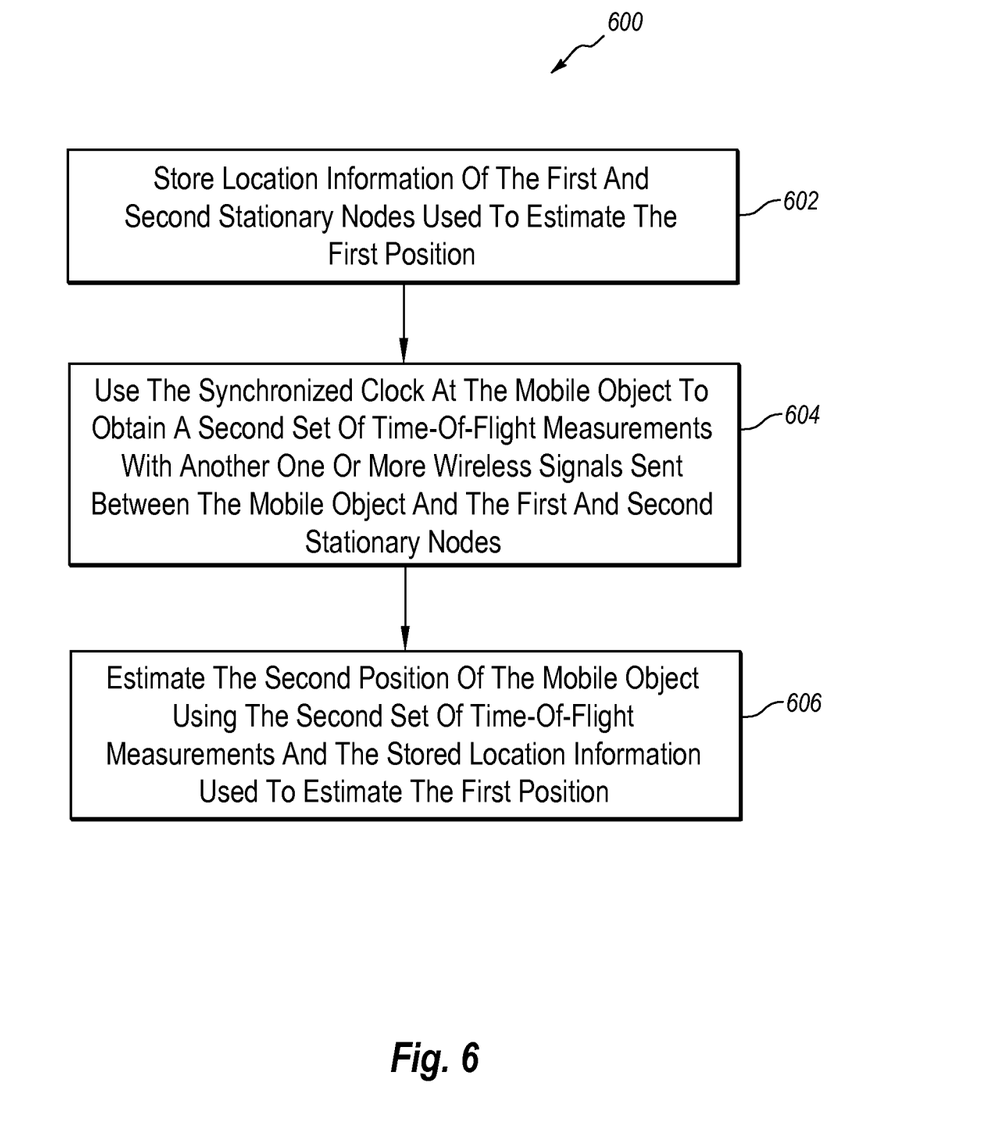
FIG. 6 shows another example method for locating an object in the system of FIG. 1.

FIG. 6 shows an example method 600 for locating mobile object 104 when it has moved to a second position. In method 600, which is performed after method 500, the location information of the first and second stationary nodes used to estimate the first position is stored (stage 602). A memory in which the location information is stored may be located at any node or device in or in communicative relationship with system 100, including at mobile object 104. After mobile object 104 moves to a second position, the synchronized clock at mobile object 104 is used to obtain a second set of time-of-flight measurements with another one or more wireless signals sent between mobile object 104 and the first and second stationary nodes (stage 604). Optionally, the clock at mobile object 104 is resynchronized before obtaining the second set of time-of-flight measurements. Finally, the second position of mobile object 104 is estimated using the second set of time-of-flight measurements and the stored location information used to estimate the first position (stage 606).

Method 600 may be implemented when the second position is close enough to the first position that time-of-flight distances to the same first and second stationary nodes may be used to estimate the second position. If, however, the second position of mobile object 104 is closer to another set of stationary nodes, e.g., third and fourth stationary nodes, the stored location data corresponding to the first and second stationary nodes is not used and the location data of the third and fourth stationary nodes is instead used. However, by storing the location information of stationary nodes used during estimation of a first position, the location of mobile object 104 can be estimated repeatedly at different subsequent positions within the same relative vicinity without the need to reacquire a new set of stationary nodes' location information.

In addition to the various alternative methods described above, various other versions of methods 500 and 600 may be implemented including versions in which various acts are modified, omitted, or new acts added or in which the order of the depicted acts differ. For example, at stage 504 a clock maintained at mobile object 104 is synchronized with a common time base maintained by a clock at each of the first and a second stationary node of system 100. However, stage 504 may be modified to omit synchronization of the clock at mobile object 104 and instead include estimation of an offset of the clock at mobile object 104. In this modified version of method 500, time-stamps generated at mobile object 104 are generated without the benefit of a synchronized clock, but are offset-corrected with respect to the common time base before being used to obtain time-of-flight measurements in subsequent stage 506.

VI. Computer Hardware and/or Software Implementations

Embodiments described herein may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The foregoing detailed description of various embodiments is provided by way of example and not limitation. Accordingly, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for locating an object, the method comprising:

establishing a bidirectional channel between the object and a master node of a network, wherein the master node is a stationary node, and the object is configured to communicate at least indirectly with the master node;

using the bidirectional channel, synchronizing a clock maintained at the object and first and second clocks at respective first and second slave nodes, the synchronizing including transmitting at least one synchronization message that includes a timestamp, the synchronizing based on a common time base governed by a master clock at the master node, wherein the first and second slave nodes are stationary nodes;

obtaining a first set of time-of-flight measurements using the common time base and one or more wireless signals sent between the object and the first and second slave nodes;

estimating a first position of the object using the first set of time-of-flight measurements and location information of the first and second slave nodes;

receiving non-location data at the object at the first position;

transferring the non-location data to the first slave node; and storing the non-location data, the storing including associating the non-location data with the first position.

* * * * *